United States Patent
Baral et al.

(10) Patent No.: US 10,078,883 B2
(45) Date of Patent: Sep. 18, 2018

(54) WRITING GRAPHICS DATA FROM LOCAL MEMORY TO SYSTEM MEMORY

(71) Applicant: QUALCOMM Incorporated, San Diego, CA (US)

(72) Inventors: Siddhartha Baral, Erie, CO (US); Avinash Seetharamaiah, San Diego, CA (US); Christopher Paul Frascati, Oviedo, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/958,911

(22) Filed: Dec. 3, 2015

(65) Prior Publication Data

US 2017/0161863 A1 Jun. 8, 2017

(51) Int. Cl.
| | |
|---|---|
| *G06F 15/80* | (2006.01) |
| *G06T 1/60* | (2006.01) |
| *G06T 15/80* | (2011.01) |
| *G06T 1/20* | (2006.01) |

(52) U.S. Cl.
CPC .................. *G06T 1/60* (2013.01); *G06T 1/20* (2013.01); *G06T 15/80* (2013.01); *G06T 2210/12* (2013.01); *G06T 2210/52* (2013.01)

(58) Field of Classification Search
CPC ..... G06T 1/20; G06T 15/005; G06T 2210/52; G09G 5/393; G09G 5/363
USPC ....................................................... 345/505
See application file for complete search history.

(56) References Cited

U.S. PATENT DOCUMENTS

| | | | |
|---|---|---|---|
| 4,958,378 A | 9/1990 | Bell | |
| 6,801,203 B1 * | 10/2004 | Hussain | G06T 1/20 |
| | | | 345/502 |
| 6,888,551 B2 * | 5/2005 | Willis | G06F 12/1027 |
| | | | 345/545 |
| 7,145,566 B2 | 12/2006 | Karlov | |
| 7,671,865 B2 | 3/2010 | Willis et al. | |
| 7,995,068 B2 | 8/2011 | Willis et al. | |
| 8,760,460 B1 | 6/2014 | Kilgariff et al. | |
| 8,988,443 B2 | 3/2015 | Croxford et al. | |
| 9,177,534 B2 | 11/2015 | Jeganathan et al. | |
| 2012/0069021 A1 * | 3/2012 | Son | G06T 15/40 |
| | | | 345/426 |
| 2012/0176386 A1 | 7/2012 | Hutchins | |
| 2012/0268480 A1 | 10/2012 | Cooksey et al. | |
| 2012/0293545 A1 | 11/2012 | Engh-Halstvedt et al. | |

(Continued)

OTHER PUBLICATIONS

International Search Report and Written Opinion from International Application No. PCT/US2016/061847, dated Jan. 24, 2017, 12 pp.

(Continued)

*Primary Examiner* — Ke Xiao
*Assistant Examiner* — Gordon Liu
(74) *Attorney, Agent, or Firm* — Shumaker & Sieffert, P.A.

(57) ABSTRACT

This disclosure is directed to graphics data storage. A graphics processing unit (GPU) may determine pixels of a tile for which the GPU generated graphics data during the rendering of the tile. The GPU may store the generated graphics data in a local memory, and use the information of the pixels of the tile for which the GPU generated graphics data to limit the amount of graphics data stored in the local memory that the GPU is to write to an external memory.

16 Claims, 3 Drawing Sheets

(56) References Cited

U.S. PATENT DOCUMENTS

| | | |
|---|---|---|
| 2013/0141448 A1 | 6/2013 | Yokota et al. |
| 2014/0063034 A1 | 3/2014 | Abarca et al. |
| 2014/0146064 A1 | 5/2014 | Seetharamaiah et al. |
| 2014/0354664 A1 | 12/2014 | Brown |
| 2015/0084983 A1 | 3/2015 | Croxford et al. |
| 2016/0163014 A1* | 6/2016 | Yang ..................... G06T 11/40 345/502 |

OTHER PUBLICATIONS

Response to First Written Opinion from corresponding Application Serial No. PCT/US2016/061847 filed Jun. 22, 2017 (26 pages).
Second Written Opinion from corresponding Application Serial No. PCT/US2016/061847 dated Jul. 28, 2017 (7 pages).
International Preliminary Report on Patentability from corresponding PCT Application Serial No. PCT/US2016/061847 dated Nov. 20, 2017 (34 pages).

* cited by examiner

WRITING GRAPHICS DATA FROM LOCAL MEMORY TO SYSTEM MEMORY

TECHNICAL FIELD

This disclosure relates to graphics processing units (GPUs), and more particularly, to GPUs writing graphics data from local memory to system memory.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands and generate the graphics data. As the graphics data is being generated, the GPU stores the generated graphics data in local memory. Then, when all of the graphics data is generated, the GPU outputs the graphics data stored in local memory to system memory.

SUMMARY

This disclosure is directed to graphics data storage. After a graphics processing unit (GPU) completes the generation of graphics data of pixels of a tile, the GPU stores the graphics data, which is stored in local memory of the GPU, to system memory. However, not all graphics data of the tile may have changed from a previous rendering of the tile.

In some examples, a rendering backend of the GPU determines during the generation of the graphics data for pixels of a tile which pixels of the tile have different graphics data relative to a previous rendering of the tile. For example, the rendering backend may determine the pixels of the tile for which a pixel shader executed, and may determine that graphics data for the pixels for which the pixel shader executed changed relative to the existing pixel data in the system memory at the location at which the rendering backend would store the pixel values of the pixels for which the pixel shader executed. The GPU may utilize the information indicating the determined pixels having graphics data that changed, and store the graphics data for those pixels from the local memory to the system memory, and not for any of the other pixels of the tile. In this manner, the amount of graphics data that needs to be written to system memory may be reduced.

In one example, this disclosure describes a method of graphics data storage, the method comprising determining, with a graphics processing unit (GPU) and during rendering of a tile, pixels of the tile for which the GPU generated graphics data as part of the rendering of that tile, storing, in a local memory of the GPU, graphics data for pixels of the tile for which the GPU generated the graphics data as part of the rendering of that tile, and writing, to an external memory that is external to an integrated circuit that includes the GPU, the graphics data stored in the local memory for pixels of the tile for which the GPU generated the graphics data as part of the rendering of that tile without writing graphics data stored in the local memory for all pixels of the tile.

In one example, this disclosure describes a device for graphics data storage, the device comprising an external memory and an integrated circuit comprising a graphics processing unit (GPU) and a local memory. The GPU is configured to determine, during rendering of a tile, pixels of the tile for which the GPU generated graphics data as part of the rendering of that tile, store, in the local memory, graphics data for pixels of the tile for which the GPU generated the graphics data as part of the rendering of that tile, and write, to the external memory that is external to the integrated circuit, the graphics data stored in the local memory for pixels of the tile for which the GPU generated the graphics data as part of the rendering of that tile without writing graphics data stored in the local memory for all pixels of the tile.

In one example, this disclosure describes a device for graphics data storage, the device comprising an external memory and an integrated circuit comprising a graphics processing unit (GPU) and a local memory. The GPU comprises means for determining pixels of a tile for which the GPU generated graphics data as part of rendering of that tile, means for storing graphics data for pixels of the tile for which the GPU generated the graphics data, in the local memory, as part of the rendering of that tile, and means for writing the graphics data stored in the local memory for pixels of the tile for which the GPU generated the graphics data, to the external memory, as part of the rendering of that tile without writing graphics data stored in the local memory for all pixels of the tile.

In one example, this disclosure describes a non-transitory computer-readable storage medium having instructions stored thereon that when executed cause a graphics processing unit (GPU) for a device for graphics data storage to determine, during rendering of a tile, pixels of the tile for which the GPU generated graphics data as part of the rendering of that tile, store, in a local memory of the GPU, graphics data for pixels of the tile for which the GPU generated the graphics data as part of the rendering of that tile, and write, to an external memory that is external to an integrated circuit that includes the GPU, the graphics data stored in the local memory for pixels of the tile for which the GPU generated the graphics data as part of the rendering of that tile without writing graphics data stored in the local memory for all pixels of the tile.

The details of one or more examples of the disclosure are set forth in the accompanying drawings and the description below. Other features, objects, and advantages of the disclosure will be apparent from the description and drawings, and from the claims.

DETAILED DESCRIPTION

Graphics processing includes a first pass in which a graphics processing unit (GPU) determines which primitives belong to which tiles, and a second pass in which the GPU renders pixels of primitives in each of the tiles based on the determination of which primitives belong to which tiles. The second pass for any given tile includes three sub-tasks. The first sub-task is the GPU retrieving from system memory (e.g., off-chip memory that is accessible by a bus that interconnects various components of the device that includes the GPU) any existing graphics data associated with the location of the current tile being rendered and storing the graphics data into local memory of the GPU (e.g., on-chip memory that does not require the bus of the device for communication). The second sub-task is the GPU rendering graphics data for pixels in the tile and outputting the graphics data to local memory of the GPU. The third sub-task is the GPU outputting from the local memory to the system memory that is for storing the corresponding graphics data of the tile.

During the second sub-task, the GPU may not necessarily render every single pixel within a particular tile. For example, if all primitives falling inside a tile only cover a small fraction of the total area of the tile or if the newly determined graphics data for a pixel in the tile is the same as the existing data retrieved from the first sub-pass, then the GPU may not render that pixel. A pixel with changed graphics data is referred to as a dirty pixel, and a region that includes a plurality of dirty pixels is referred to as a dirty region.

To render a pixel, the GPU executes a pixel shader (also referred to as a fragment shader) that performs per pixel operations to determine the final graphics data for the pixel (e.g., color values). However, the pixel shader may not determine the exact location to which the rendered pixel maps in the tile or the location where the rendered pixel is to be stored in the local memory.

To perform the storage of the graphics data of the rendered pixel to the local memory, the GPU includes a rendering backend (e.g., a hardware unit in the graphics pipeline, but could be a software unit as well). Any time the pixel shader is to output graphics data of a pixel, it is the function of the rendering backend to determine where the graphics data is to be stored in the local memory. In some cases, the location where the graphics data for a pixel is stored in the local memory maps to a location in the tile where the pixel is located.

Because the pixel shader may only render those pixels that changed from frame-to-frame, the techniques describe in the disclosure exploit the rendering backend for purposes of identifying which pixels changed. For example, the rendering backend may track the pixels of a tile for which the pixel shader executed and requested to output the resulting data (e.g., it may be possible that the pixel shader executes, but does not request that the data be outputted in which case the system memory does not need to be updated), and store information identifying the pixels of the tile for which the pixel shader executed for rendering that tile.

Then, when the GPU is to implement the third sub-task of writing the graphics data from the local memory to the system memory, the GPU may rely on the stored information to write graphics data for pixels of the tile for which the pixel shader was executed. The graphics data for the pixels of the tile for which the pixel shader did not execute is the same as the graphics data of co-located pixels in the previous tile, and therefore, only the graphics data for the pixels for which the pixel shader executed needs to be updated. In this manner, rather than outputting all of the graphics data in the local memory to the system memory as part of the third sub-task, the techniques limit the amount of graphics data that needs to be written from local memory to system memory.

There may be various ways in which the GPU may output the graphics data for the pixels for which the pixel shader executed. As one example, the GPU may only output graphics data for the pixels for which the pixel shader executed. As another example, the GPU may dynamically determine a bounding box based on the pixels for which the pixel shader executed such that the bounding box surrounds a plurality of pixels for which the pixel shader executed. This bounding box may also include pixels of the tiles for which the pixel shader did not execute, but in general there will be more pixels for which the pixel shader executed than not. Therefore, even if the GPU outputted the graphics data for all of the pixels in the bounding box, the amount of graphics data that the GPU outputs to system memory is still reduced. In some examples, there may be multiple such bounding boxes.

Some techniques rely on the application executing on the processor to provide hints to the GPU such as the dimensions of a scissor region to reduce the amount of graphics data the GPU needs to output. However, the application may not be able to provide sufficient granularity for pixels that can be excluded because the application may not be able to specify exactly which pixels will ultimately be rendered and which will not. With the techniques described in this disclosure, the GPU may be able to further limit the amount of graphics data that the GPU needs to write to system memory by dynamically determining which pixels changed relative to a previous tile. For example, the GPU may be able to determine, within the scissor region, the pixels for which graphics data needs to be written, rather than writing the graphics data for all pixels within the scissor region.

Figure 1:
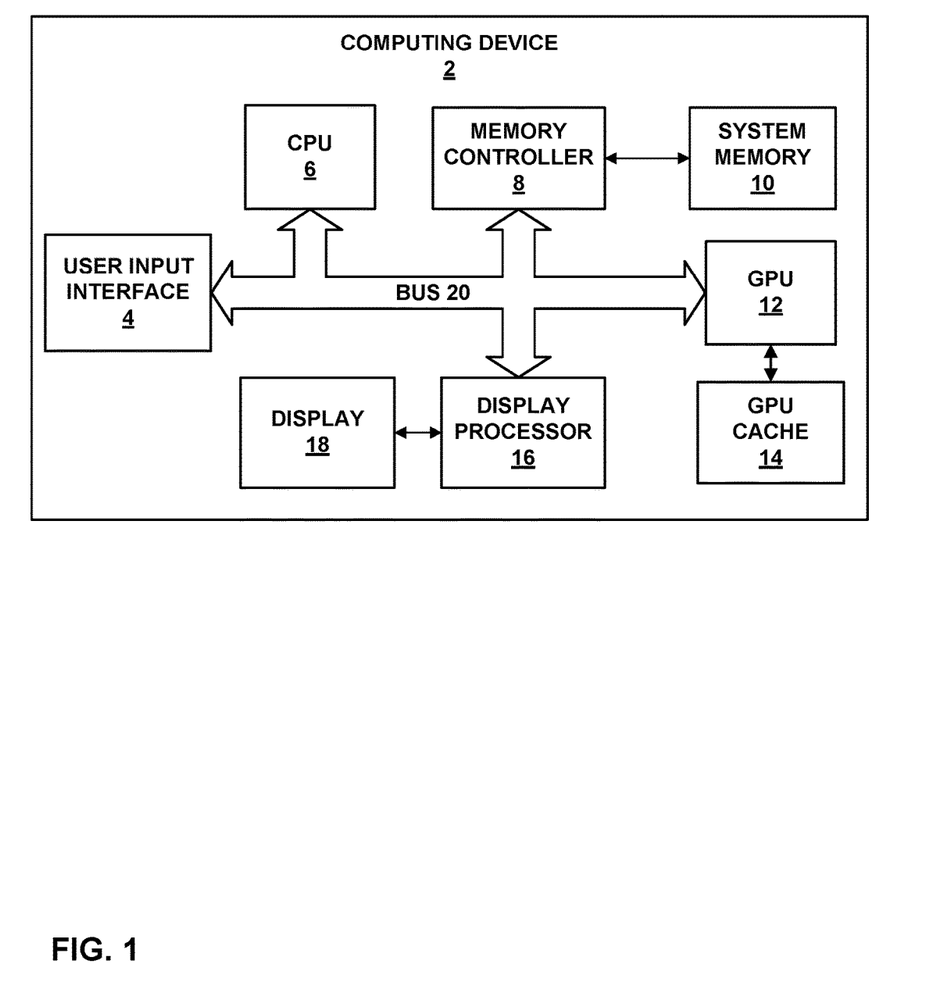
FIG. 1 is a block diagram illustrating an example computing device that may be used to perform graphics data storage techniques of this disclosure.

FIG. 1 is a block diagram illustrating an example computing device 2 that may be used to perform graphics data storage techniques of this disclosure. Computing device 2 may comprise a personal computer, a desktop computer, a laptop computer, a computer workstation, a video game platform or console, a wireless communication device (such as, e.g., a mobile telephone, a tablet device, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a GPU cache 14, a display processor 16, a display 18 and bus 20. User input interface 4, CPU 6, memory controller 8, GPU 12 and display processor 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory system 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18 via display processor 16. Thus, when one of the software applications executing on CPU 6 requires graphics processing, CPU 6 may provide graphics commands and graphics data to GPU 12 for rendering to display 18. The graphics commands may include, e.g., drawing commands, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purposed computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU cache 14. Thus, GPU 12 may read data from and write data to GPU cache 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU cache 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer that is allocated within system memory 10. Display processor 16 may retrieve the data from the frame buffer and configure display 18 to display the image represented by the rendered image data. In some examples, display processor 16 may include a digital-to-analog converter (DAC) that is configured to convert the digital values retrieved from the frame buffer into an analog signal consumable by display 18. In other examples, display processor 16 may pass the digital values directly to display 18 for processing.

Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer or other computing device via a cable or wireless link.

In the examples described in this disclosure, GPU 12 may be configured to implement tile-based rendering. In tile-based rendering, GPU 12 divides a frame to be rendered into a plurality of tiles, and renders the graphics data in each tile sequentially. For instance, GPU 12 generates graphics data for pixels in a tile and stores the graphics data for that tile in GPU cache 14. GPU 12 then outputs the graphics data from GPU cache 14 to memory 10 for that tile. GPU 12 repeats these steps for all tiles in the frame to render the frame.

In such tile based rendering, GPU 12 usually performs two passes to draw a scene (e.g., a render a frame). In the first pass (also referred to VizBinning or visibility stream generation pass), GPU 12 generates per bin (per tile) visibility information of all primitives. For example, GPU 12 determines to which tile (e.g., bin) vertices of the primitives belong. If the vertex is within a tile, then that vertex is considered to belong to that tile. GPU 12 may perform similar function for other pixels of the primitives as well to determine the per bin visibility information of all primitives.

For example, assume that GPU 12 divided a frame into 10 tiles and there are a total of 100 primitives to render. In this example, GPU 12 may associate 100 bits to each of the tiles, where each bit is associated with a primitive, for a total of 1000 bits (100*10). If a primitive is visible in a particular tile, GPU 12 may set the bit associated with that primitive equal to 1 and if the primitive is not visible in a particular tile, GPU 12 may set the bit associated with that primitive equal to 0. The resulting 100 bits for each of the tiles is the visibility stream. There may be additional information in the visibility stream, and the above is provided merely as one example.

In the second pass, GPU 12 uses the visibility information generated in the first pass while executing rendering commands for each bin (e.g., tile). For example, based on the visibility information, the GPU 12 generates graphics data for pixels within the tile. The second pass includes three different sub-tasks.

The first sub-task is the load/unresolve pass. In this first sub-task, GPU 12 retrieves graphics data from memory 10 and stores the data in GPU cache 14. This context data may be any existing graphics data associated with the location of the current tile being rendered. The graphics data that GPU 12 retrieves from memory 10 may be considered as graphics data for the pixels of the tile that is to be rendered. GPU 12 may then render the tile and update the graphics data for the pixels of the tile for which GPU 12 generated graphics data.

The second sub-task is the actual rendering pass. For instance, in the second sub-task, GPU 12 generates the graphics data for pixels in the tile and outputs the generated graphics data to GPU cache 14. GPU 12 generates graphics data by implementing a graphics pipeline. As described in more detail, the graphics pipeline includes a pixel shader (also referred to as a fragment shader) that generates per pixel graphics data. In this second sub-task, GPU 12 outputs the graphics data generated by the execution of the pixel shader to GPU cache 14. In some examples, each storage location in GPU cache 14 is associated with a location in the tile. GPU 12 may store the graphics data of a pixel of the tile in a location in GPU cache 14 that is associated with a location in the tile in which the pixel is located.

In the third sub-task, GPU 12 writes the graphics data stored in GPU cache 14 to memory 10. For example, GPU 12 writes the result of the rendering pass of the second sub-task to memory 10.

The first sub-task and the third sub-task result in GPU 12 reading from and writing to external system memory 10 via bus 20. Therefore, GPU 12 consumes memory bandwidth of bus 20 when reading from and writing to memory 10, and the amount of memory bandwidth needed is based on the amount of data that GPU 12 needs to read or write. Also, power consumption is based on the amount of data that GPU 12 needs to read or write (e.g., more power for more data, and less power for less data).

In non-tile based rendering, GPU 12 may be able to write directly to memory 10, the repeated reads and writes for each tile may not be needed, but in tile-based rendering, there is repeated reading and writing to memory 10. While there are benefits to tile-based rendering such as reduction in the number of pixels that need to rendered based on the visibility information generated in the first pass, as compared to non-tile based rendering, it may still be beneficial to limit the amount of data that needs to be read from and written to external memory 10 for tile-based rendering.

In general, it may be beneficial to limit the amount of data that needs to travel on bus 20 for promoting efficient memory bandwidth usage and power consumption. For instance, if there is a reduction in the amount of data that GPU 12 needs to write to external memory 10, then there is a reduction in power consumption. Also, usage of bus 20 by other components becomes available sooner if there is less data that GPU 12 needs to write to memory 10.

In some cases, there may be ways to limit the amount of data that GPU 12 needs to read from memory 10 in the first sub-task. As an example, the application executing on CPU 6 that generates the data that is processed by GPU 12 may provide GPU 12 with information such as "discard rectangles" or inline clear (e.g., a hint from the application) that GPU 12 uses to limit how much data is retrieved. For example, CPU 6 may define an area (e.g., discard rectangle) within the portion of memory 10 for which GPU 12 does not to read data.

However, there may be limited information that the application executing on CPU 6 can provide for reducing the amount of graphics data GPU 12 needs to output in the third sub-task. The reason why there is limited information that the application can provide for reducing the amount of data GPU 12 writes is because the application does not have sufficient information indicating the pixels for which GPU 12 will output the graphics data until GPU 12 completes generating the graphics data.

The limited information that the application can provide GPU 12 to reduce the amount of graphics data that needs to be written in the third sub-task may be information of a scissor region. The scissor region defines the portion of the frame that is visible, and may be less than the entire frame. The scissor region may reduce the amount of graphics data that GPU 12 needs to write to memory 10 because GPU 12 may output graphics data only for those portions of the frame that are visible. Although GPU 12 may utilize the scissor region to reduce the amount of data that is to be written to memory 10, the techniques described in this disclosure may further reduce the amount of graphics data that GPU 12 needs to output to memory 10.

Because there is limited information that the application can provide to reduce the amount of graphics data GPU 12 needs to write, GPU 12 may write the entirety of graphics data stored in GPU cache 14 to memory 10 for every tile. In some cases, however, GPU 12 may not need to write all of the graphics data stored in GPU cache 14 to memory 10.

For example, in many cases, only a small portion in a tile has pixels having graphics data that GPU 12 generated (e.g., only a few areas of the render target or depth/stencil buffer that indicates whether a pixel is visible are updated). For the rest of the pixels of the tile, GPU 12 may not have generated any graphics data. For example, GPU 12 may not generate graphics data for a pixel because the pixel failed the depth test. GPU 12 may determine that a pixel is occluded by another pixel based on values stored in the depth/stencil buffer, and may not generate pixel values for the occluded pixel. As another example, the graphics data of a pixel in the tile may not have changed relative to a co-located pixel in the previous tile (i.e., frame-to-frame the graphics data of co-located pixels in the previous and current frame did not change). As yet another example, GPU 12 may process a transparent pixel where the depth test is passed, but for which GPU 12 still does not generate graphics data (as there is not graphics data to generate).

The above are a few examples for where GPU 12 may not generate graphics data for pixels of a tile. Stated another way, in some cases, GPU 12 generates graphics data only for some, but not all, of the pixels of a tile. The above examples for cases where GPU 12 generates graphics data for some, but not all, of the pixel so a tile are provided to assist with understanding, and should not be considered limiting. In any event, in cases where GPU 12 does not generate graphics data for some pixels of a tile, GPU 12 may not need to write all of the graphics data stored in GPU cache 14 to memory 10. For example, GPU 12 reads data from memory 10 for storage in GPU cache 14 as part of the first sub-task in the second pass, and then GPU 12 updates graphics data for some of the storage locations within GPU cache 14, but not all storage locations, because GPU 12 did not generate graphics data for all pixels of the tile. In this case, there are storage locations of GPU cache 14 for which there is no change in data (e.g., the data in memory 10 is the same as the data in GPU cache 14 because GPU 12 did not update the storage location of GPU cache 14 with updated graphics data). However, GPU 12 still writes all of the data from GPU cache 14 to memory 10.

This disclosure describes example ways that GPU 12 tracks the pixels for which GPU 12 generated graphics data that GPU 12 stored in GPU cache 14. For example, GPU 12 may perform this tracking in real-time (i.e., dynamic tracking) as GPU 12 is generating graphics data for the tile, rather than after GPU 12 completes generating the graphics data for the tile. Then, based on the information of the pixels for which GPU 12 generated graphics data, GPU 12 may write less than all of the graphics data stored in GPU cache 14 (e.g., without writing graphics data stored in GPU cache 14 for all pixels of the tile).

Accordingly, in the techniques described in this disclosure, GPU 12 may determine, during rendering of a tile, pixels of the tile for which GPU 12 generated graphics data as part of the rendering of that tile. GPU 12 may store in a local memory of GPU 12 (e.g., GPU cache 14) graphics data for pixels of the tile for which GPU 12 generated the graphics data as part of the rendering of that tile. GPU 12 may then write to an external memory 10, i.e., that is external to a chip that includes GPU 12, the graphics data stored in the local memory for pixels of the tile for which GPU 12 generated the graphics data as part of the rendering of that tile without writing graphics data stored in the local memory for all pixels of the tile.

As described in more detail below, one way that GPU 12 may determine pixels of a tile for which GPU 12 generated graphics data is to determine pixels of the tile for which GPU 12 executed a pixel shader (also referred to as a fragment shader) and instructed the resulting graphics data to be stored in GPU cache 14 (e.g., local memory of GPU 12). As one example, GPU 12 includes a rendering backend unit (e.g., hardware or software unit) that outputs the generated graphics data to GPU cache 14, and the rendering backend unit may track pixels of the tile for which GPU 12 generated graphics data. GPU 12 may utilize the information indicating pixels of the tile for which GPU 12 generated graphics data as determined by the rendering backend to determine what graphics data stored in the GPU cache 14 should be written to memory 10.

Figure 2:
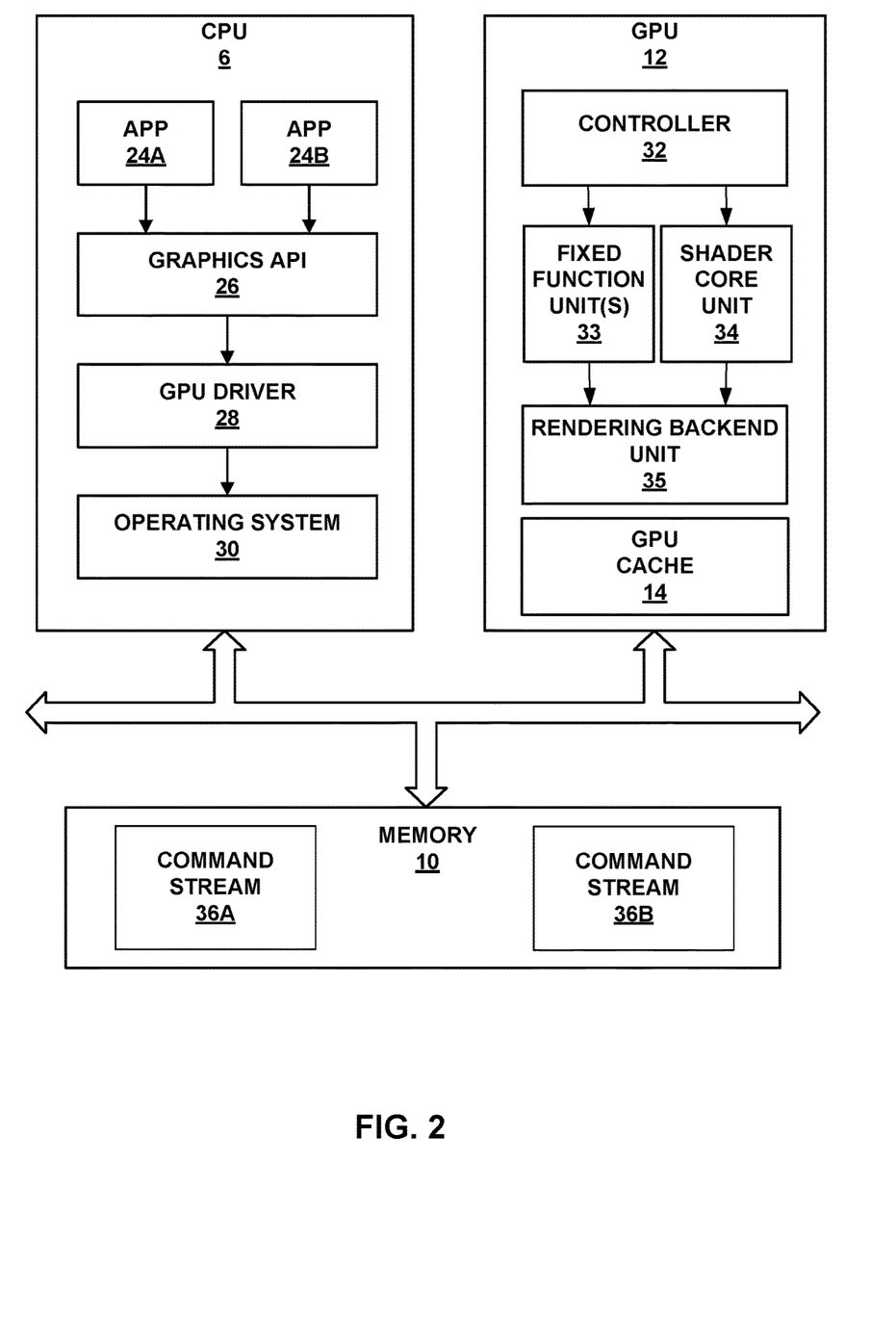
FIG. 2 is a block diagram illustrating the central processing unit (CPU), the GPU and the memory of the computing device in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC). CPU 6 is configured to execute software applications 24A, 24B, a graphics API 26, a GPU driver 28 and an operating system 30.

GPU 12 includes a controller 32, one or more fixed-function units 33, shader core unit 34, and rendering back-end unit 35. In the example illustrated in FIG. 2, for ease, GPU cache 14 is illustrated as being internal to GPU 12. In general, computing device 2 includes memory 10 and an integrated circuit. The integrated circuit includes GPU 12 and GPU cache 14 (e.g., local memory of GPU 12). GPU 12 and GPU cache 14 may be formed in the same integrated circuit and on the same chip so that GPU 12 can store and retrieve data from GPU cache 14 without needing access to bus 20. Memory 10 is external to GPU 12 in the sense that memory 10 is not on the same integrated circuit as GPU 12 and GPU 12 accesses memory 10 via bus 20.

Software applications 24A, 24B may each include at least one of one or more instructions that cause graphics images to be displayed or one or more instructions that cause a non-graphics task (e.g., a general-purposed computing task) to be performed on GPU 12. Software applications 24A, 24B may issue instructions to graphics API 26. Graphics API 26 may be a runtime service that translates the instructions received from software applications 24A, 24B into a format that is consumable by GPU driver 28.

GPU driver 28 receives the instructions from software applications 24A, 24B, via graphics API 26, and controls the operation of GPU 12 to service the instructions. For example, GPU driver 28 may formulate one or more command streams 36A, 36B, place the command streams 36A, 36B into memory 10, and instruct GPU 12 to execute command streams 36A, 36B. GPU driver 28 may place command streams 36A, 36B into memory 10 and communicate with GPU 12 via operating system 30, e.g., via one or more system calls.

GPU 12 includes one or more processing units such as one or more fixed function units 33 and a programmable processing unit such as shader core unit 34. Shader core unit 34 is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, shader core unit 34 may include a plurality of processing units that are configured to operate in parallel, e.g., an SIMD pipeline. Shader core unit 34 may have a program memory that stores shader program instructions and an execution state register, e.g., a program counter register that indicates the current instruction in the program memory being executed or the next instruction to be fetched. Examples of shader programs that execute on shader core unit 34 may include, for example, vertex shaders, pixel shaders (also called fragment shaders), geometry shaders, hull shaders, domain shaders, compute shaders, and/or unified shaders.

One or more fixed-function units 33 may include hardware that is hard-wired to perform certain functions. Although fixed-function units 33 may be configurable, via one or more control signals for example, to perform different functions, the fixed function hardware typically does not include a program memory that is capable of receiving user-compiled programs. In some examples, one or more fixed-function units 33 may include, for example, processing units that perform raster operations, such as, e.g., depth testing, scissors testing, alpha blending, etc.

One or more fixed-function units 33 and shader core unit 34 together form a graphics processing pipeline. For example, the units of fixed-function units 33 receive data, process the data to generate intermediate data, and output the resulting intermediate data to the next unit. When programmable processing is needed (e.g., by a vertex shader or a pixel shader), fixed-function units 33 output the intermediate data to shader core unit 34 that is executing the shader program for further processing and generation of intermediate data that is then outputted to the next unit. In this way, GPU 12 generates final graphics data for a pixel in a pipeline form (e.g., sequentially stepping through the units that form the pipeline).

As illustrated, GPU 12 includes rendering backend unit 35. Rendering backend unit 35 forms the interconnection between GPU 12 and GPU cache 14. For example, after the graphics pipeline of GPU 12 generates the final graphics data for a pixel, rendering backend unit 35 is configured to output the graphics data to GPU cache 14. Rendering backend unit 35 may be a fixed-function hardware unit, and therefore may be part of fixed-function units 33 in some examples, or may be software or firmware executing on shader core unit 34. Rendering backend unit 35 is illustrated separately to ease with understanding.

In the example graphics processing system of FIG. 2, memory 10 includes two command streams 36A, 36B, each command stream 36A, 36B being associated with a different graphics application context (i.e., a different one of software applications 24A, 24B). For example, command stream 36A is associated with a graphics application context for software application 24A, and command stream 36B is associated with a graphics application context for software application 24B. For ease of illustration, two GPU command streams 36A, 36B are depicted as being stored in memory 10 of the example graphics processing system of FIG. 2. In other examples, however, the same or a different number of GPU command streams may be used that are stored in the same or different components of a graphics processing system.

GPU driver 28 of CPU 6 may be configured to write command streams 36A, 36B to memory 10, and controller 32 of GPU 12 may be configured to read one or more commands of command streams 36A, 36B from memory 10. Controller 32 may be configured to schedule the tasks of GPU 12, load commands that are to be executed by GPU 12, output resulting graphics data to memory 10, and the like. For instance, controller 32 may read command streams 36A, 36B and cause fixed-function units 33 to perform their respective functions in accordance with command streams 36A, 36B as well as instruct shader core unit 34 to execute respective shader programs as needed and load the shader programs on shader core unit 34 for execution. When graphics data is to be written from GPU cache 14 to memory 10 (e.g., as part of the third sub-task of the second pass), controller 32 may write the graphics data from GPU cache 14 to memory 10. Controller 32 may be hardware of GPU 12, software or firmware executing on hardware of GPU 12, or a combination of hardware, software, and/or firmware.

As described above, GPU 12 may be configured to tile-based rendering that includes a first pass and a second pass. In some examples, a vertex shader executing on shader core unit 34 and a rasterizer of fixed-function units 33 may be configured to perform the first pass to determine which primitives belong to which tiles (e.g., generate the visibility stream). This first pass is generally completed before final generation of the graphics data for pixels of the tile (e.g., prior to execution of the pixel shader that generates the per pixel graphics data).

The second pass includes the first, second, and third sub-tasks. In the first sub-task, controller 32 reads graphics data stored in memory 10 for storage in GPU cache 14. As one example, controller 32 reads the render target (RT) and depth stencil (DS) information from memory 10. This information may be information of the tile of the previous frame or information that the application executing on CPU 6 generated indicating what portion is to be rendered. There are other examples of information that controller 32 reads from memory 10 for storage in GPU cache 14.

In the second sub-task, controller 32 may cause a pixel shader to execute on shader core unit 34 to generate per pixel graphics data. For example, for every pixel for which GPU 12 is to generate graphics data, controller 32 may cause one instance of the pixel shader to execute on shader core unit 34 for each of the pixels.

While the pixel shader may generate the graphics data for a pixel of the tile, the pixel shader may not be configured to determine for which pixel of the tile the pixel shader generated the graphics data. For example, the pixel shader may generate color values for a pixel, but may not determine for which particular pixel of the tile the pixel shader generated the color values.

One of the functions of rendering backend unit 35 is to determine the pixel of the tile to which the pixel belongs (e.g., based on coordinate data) and store the pixel values in a storage location of GPU cache 14 that corresponds to the location of the tile to which the pixel belongs. For instance, assume the tile is 10×10. In this example, the storage location of GPU cache 14 form a 10×10 matrix, where each storage location corresponds to a location in the tile (e.g., storage location (0, 0) in GPU cache 14 corresponds to location (0, 0) in the tile, storage location (0, 1) in GPU cache 14 corresponds to location (0, 1) in the tile, and so forth). Rendering backend unit 35 may determine that the graphics data generated by the pixel shader is for the pixel located at (0, 5) in the tile, and may store the graphics data at location (0, 5) in the storage locations of GPU cache 14.

The above correspondence of storage locations and tile locations are provided for ease of illustration only and should not be considered limiting. In general, to store graphics data in GPU cache 14, rendering backend unit 35 may determine respective locations in the tile for each of the pixels for which GPU 12 (e.g., via the pixel shader) generated graphics data as part of the rendering of the tile (e.g., as part of the second sub-task). Rendering backend unit 35 may determine storage locations of GPU cache 14 that correspond to the determined respective locations in the tile for each of the pixels for which GPU 12 generated graphics data as part of the rendering of the tile. Rendering backend unit 35 may then store the graphics data generated by GPU 12 (e.g., via the pixel shader) in the determined storage locations of GPU cache 14.

Then in the third sub-task, controller 32 may cause rendering backend unit 35 or some other unit of GPU 12 that interfaces with memory 10 to write the graphics data stored in GPU cache 14 to memory 10. As described above, in the first sub-task, GPU cache 14 stored graphics data read from memory 10, which may include graphics data of a co-located tile in the previous frame (e.g., the graphics data of the tile located in the same position in the current frame, but in the previous frame).

In some techniques, controller 32 may cause GPU 12 to write all of the graphics data stored in GPU cache 14 to memory 10. However, not all of the graphics data stored in GPU cache 14 (as part of the first sub-task) necessarily changed during the rendering (as part of the second sub-task). Nevertheless, some techniques would still output all graphics data from GPU cache 14, including graphics data that did not change, from GPU cache 14 to memory 10, which needlessly utilizes memory bandwidth and power.

To limit the amount of graphics data stored in GPU cache 14 that GPU 12 needs to write to memory 10, GPU 12 may determine the pixels of the tile for which GPU 12 generated graphics data, and write graphics data based on the determination so that not all graphics data stored in GPU cache 14 needs to be outputted to memory 10. For example, GPU 12 may write graphics data for pixels of the tile for which GPU 12 generated graphics data during the rendering of the tile without writing graphics data stored in GPU cache 14 for all pixels of the tile. In other words, GPU 12 may write graphics data for pixels of the tile for which GPU 12 generated graphics data but not write graphics data for pixels of the tile for which GPU 12 did not generate graphics data.

In this disclosure, the pixels for which the graphics data changed are referred to as dirty pixels, and a plurality of dirty pixels forms a dirty region. Rendering backend unit 35 may determine the pixels for which the pixel shader executed and store information indicating pixels for which the pixel shader executed and/or which storage locations of GPU cache 14 store graphics data written to by rendering backend unit 35. In this way, during the rendering pass (e.g., second sub-task of the second pass), rendering backend unit 35 may keep track of all dirty regions in GPU cache 14.

In some examples, but not necessarily all examples, rendering backend unit 35 may track all dirty regions during the rendering pass or during the rendering of a tile. The phrase "during the rendering pass" or "during the rendering of a tile" means that GPU 12 has not yet outputted the graphics data to memory 10, for instance, but is not limited to the situation when not all graphics data of the tile has yet been generated.

For example, assume that rendering backend unit 35 determined that it stored the graphics data for the first pixel of the tile in GPU cache 14. In this example, before storing graphics data for another pixel of the tile in GPU cache 14, rendering backend unit 35 may store information indicating that the graphics data for the first pixel of the tile was stored in GPU cache 14 and/or store information indicating the storage location within GPU cache 14 where rendering backend unit 35 stored the graphics data of the first pixel.

Rendering backend unit 35 may track information indicating pixels for which graphics data was stored in GPU cache 14 and/or the locations of GPU cache 14 where the generated graphics data of pixels is stored as metadata. As one example, although not illustrated in FIG. 2, GPU 12 may include a plurality of registers, and rendering backend unit 35 may store information indicating pixels for which graphics data was stored in GPU cache 14 and/or the locations of GPU cache 14 where the generated graphics data of pixels in the registers (e.g., translation lookaside buffer read (TL/BR) registers) was stored. Then, after writing the graphics data from the registers, rendering backend unit 35 may reset the registers.

In some examples, controller 32 may utilize the information stored by rendering backend unit 35 to determine from which storage locations of GPU cache 14 to write the graphics data. For example, after the first sub-task of the second pass, GPU cache 14 stores graphics data for all pixels of the tile that is to be rendered (e.g., as retrieved from memory 10), then during the second sub-task of the second pass, rendering backend unit 35 updates the graphics data (e.g., stores the graphics data) for pixels of the tile for which graphics data was generated (e.g., pixels of the tile for which new graphics data was generated as part of the rendering of the tile) and stores information indicating for which storage locations of GPU cache 14 the graphics data was updated. Controller 32 may then cause GPU 12 to write the graphics data only from the storage locations of GPU cache 14 for which the graphics data was updated.

As an illustration, assume that the tile size is 10×10 pixels, and therefore GPU cache 14 may include 10×10 storage locations, where each storage location corresponds to one pixel location in the tile. In this example, after the first sub-task (load/unresolved task) of the second pass, the 10×10 storage locations of GPU cache 14 store graphics data for the tile that is to be rendered. During the rendering of the tile, rendering backend unit 35 may determine storage locations of GPU cache 14 in which rendering backend unit 35 stored generated graphics data as part of the rendering of that tile (e.g., not graphics data that was previously stored prior to the rendering of the tile or after the rendering of the tile).

Assume that rendering backend unit 35 stored graphics data in storage locations 5 and 7 of GPU cache 14. In this example, rendering backend unit 35 may store information in registers indicating that the graphics data for storage locations 5 and 7 was updated as part of the rendering, and controller 32 may write out the graphics data stored in storage locations 5 and 7 to memory 10 without writing graphics data stored in the local memory for all pixels of the tile (e.g., without necessarily writing all graphics data stored in the other 98 storage locations of GPU cache 14). In this manner, by determining the pixels of the tile for which GPU 12 generated graphics data (e.g., by determining pixels of the tile for which a pixel shader executed or for which storage locations of GPU cache 14 graphics data was written by rendering backend unit 35), the techniques described in this disclosure may limit the amount of graphics data that is written to memory 10.

In the above example, controller 32 may cause GPU 12 to write the graphics data only for the pixels of the tile for which GPU 12 generated and stored graphics data in GPU cache 14. However, the techniques described in this disclosure may not be so limited. In some examples, GPU 12 may store graphics data for a few more pixels than only those for which graphics data was generated during the rendering. In these examples, GPU 12 may potentially (and very slightly) increase memory bandwidth of bus 20, but there may be other processing efficiencies that are gained. For example, as described below, a bounding box may encompass a plurality of pixels of which not all pixels have graphics data that changed, and GPU 12 may write the graphics data for all of these pixels including those pixels for which graphics data did not change.

In some cases, it may be computationally intensive to track very single storage location of GPU cache 14 from which the graphics data is to be written to memory 10. Accordingly, rendering backend unit 35, controller 32, or some other fixed-function unit (e.g., output-merger) may dynamically determine a bounding box that encompasses a plurality of storage locations of GPU cache 14 that GPU 12 is to write to memory 10. For ease of description, rendering backend unit 35 is described as generating the bounding box, but the techniques should not be considered limited to only rendering backend unit 35 generating the bounding box.

As an example, assume that in the 10×10 storage locations of GPU cache 14, location (0, 5) and location (1, 6) store graphics data generated for pixels of a tile as part of the rendering of that tile. In this example, rendering backend unit 35 may generate a bounding box that includes the storage locations (0, 5), (1, 5), (0, 6), and (1, 6), and controller 32 may cause GPU 12 to output the graphics data stored at all four storage locations. In this case, although writing of the graphics data stored at locations (1, 5) and (0, 6) may be unnecessary because the graphics data did not change, there may be some processing efficiency gains. For instance, rendering backend unit 35 may need to store only one value indicating that the graphics data stored in the storage locations of the bounding box are to be written, rather than storing separate values for each of the storage locations for which the graphics data was stored in GPU cache 14.

In some examples, the generation of the bounding box may be performed dynamically (e.g., during runtime), and as rendering backend unit 35 is storing graphics data in GPU cache 14, rather than being a preset bounding box. Rendering backend unit 35 may follow certain rules to generate the bounding box. There may be various rules (e.g., algorithm) for generating the bounding box, and the techniques described in this disclosure should not be considered limited to any particular example algorithm or rule for generating the bounding box.

As one example, rendering backend unit 35 may be configured to limit the number of storage locations of GPU cache 14 for which no graphics data was generated to be less than or equal to 50% of all the storage locations for which graphics data was generated. As another example, rendering backend unit 35 may generate multiple bounding boxes (e.g., one or more bounding boxes). For instance, if there is one cluster of a plurality of storage locations that store graphics data generated by GPU 12 as part of the rendering of the tile and another cluster of a plurality of storage locations that store graphics data generated by GPU 12 as part of the rendering of the tile, and these two clusters are separated by at least a threshold pixel distance, then rendering backend unit 35 may generate one bounding box for the first cluster and another bounding box for a second cluster. The size of the bounding boxes may be different or the same based on the dynamic determination of which bounding boxes rendering backend unit 35 generates.

In general, GPU 12 (e.g., via rendering backend unit 35 or some other unit) determines one or more bounding boxes based on a determination of the pixels of the tile for which GPU 12 generated graphics data as part of the rendering of that tile. Each bounding box encompasses a plurality and not all storage locations of GPU cache 14 that store graphics data for pixels of the tile for which GPU 12 generated graphics data as part of the rendering of that tile. GPU 12 may write the graphics data of pixels of the tile that correspond to storage locations of GPU cache 14. In some cases, at least one of the bounding boxes encompasses at least one storage location for a pixel for which GPU 12 did not generate graphics data as part of the rendering of the tile (e.g., storage locations (0, 6) and (1, 5) in the above example).

In this way, during the rendering pass (e.g., the second sub-task of the second pass), rendering backend unit 35 may track all dirty regions in GPU cache 14 (e.g., regions in GPU cache 14 to which rendering backend unit 35 stored graphics data that was generated for pixels of a tile during the rendering of that tile). Rendering backend unit 35 (or some other unit of GPU 12) may use some algorithm (e.g., example rules described above) to determine one or more bounding boxes that encompass these dirty regions. In some cases, the bounding boxes may be the minimum size to encompass these dirty regions, and possibly the size of a single storage location for pixel level granularity.

While GPU 12 is rendering the tile, rendering backend unit 35 may dynamically increase or decrease the size of the bounding boxes as well as generate new bounding boxes. At the end, rendering backend unit 35 may store information in registers indicating the storage locations of GPU cache 14 that are encompassed by the bounding boxes.

During the third sub-task (e.g., store pass of the second pass), controller 32 may utilize the information dynamically stored in the registers during runtime indicating the storage locations of GPU cache 14 that are encompassed by the bounding boxes (again, a bounding box may encompass only one pixel) to determine which storage locations of GPU cache 14 are to be written (e.g., resolved/stored) to memory 10. After the third sub-task, rendering backend unit 34 may reset the registers for the next rendering pass.

As described above, CPU 6 (e.g., via GPU driver 28) may not be able to provide information about which graphics data to write to memory 10, and therefore in some techniques, GPU 12 would write all pixel data stored in GPU cache 14 to memory 10 as part of third sub-task. In the techniques described in this disclosure, rendering backend unit 34 dynamically stores information, during the rendering of the tile, for which storage locations of GPU cache 14 GPU 12 is to write the graphics data to memory 10. This avoids the need for the application executing on CPU 6 and GPU driver 28 to attempt to determine which locations of GPU cache 14 to write to memory 10. Rather, controller 32 may rely on the information generated during the rendering of the tile indicating the storage locations from which GPU 12 is to write graphics data to memory 10.

Once GPU 12 completes the rendering of all tiles of a frame, memory 10 stores the graphics data for an entire frame. CPU 6 may then instruct display processor 16 to retrieve the graphics stored in memory 10. Display processor 16 may retrieve the graphics data stored in memory 10 and process the retrieved graphics data for display. For example, display processor 16 may convert the graphics data values into analog signals and drive display 18 with the analog signals to display the frame.

Figure 3:
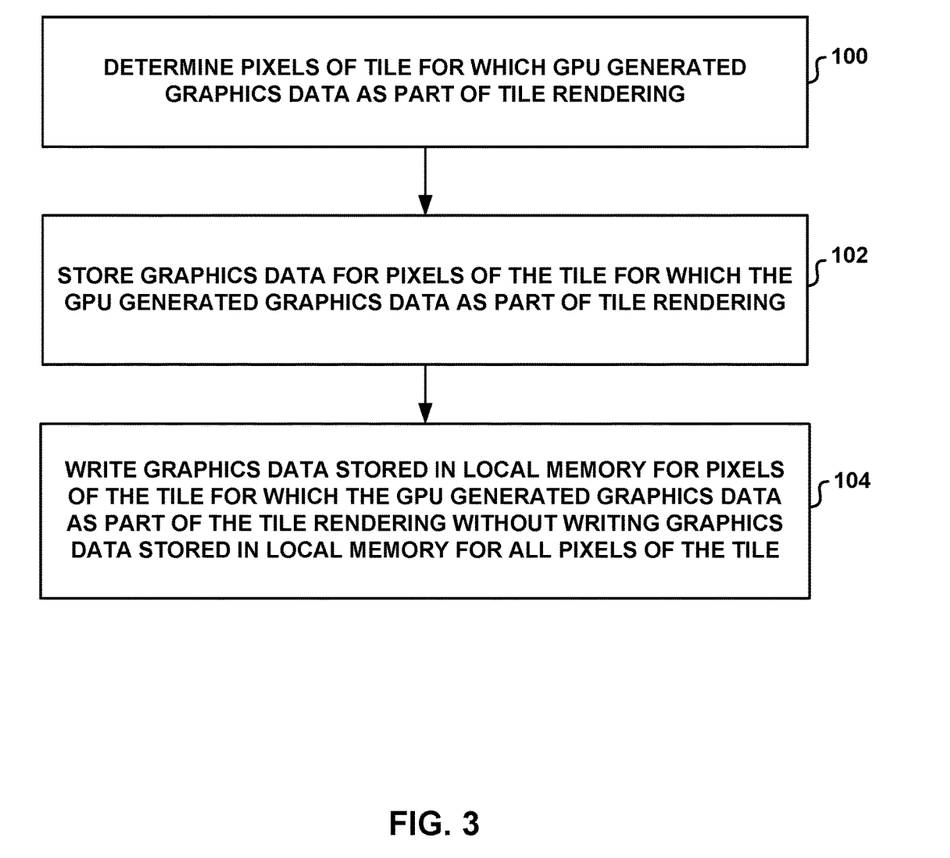
FIG. 3 is a flowchart illustrating an example technique of graphics data storage in accordance with this disclosure.

FIG. 3 is a flowchart illustrating an example technique of graphics data storage in accordance with this disclosure. The example illustrated in FIG. 3 is described with respect to computing device 2 (e.g., a wireless handset device) that includes an external memory (e.g., memory 10) and an integrated circuit that includes GPU 12 and GPU cache 14 (e.g., local memory of GPU 12). As described, memory 10 is external to the integrated circuit that includes GPU 12 and GPU cache 14.

GPU 12 may determine, during the rendering of a tile, pixels, of the tile, for which GPU 12 generated graphics data as part of the rendering of that tile (100). For example, GPU 12 includes rendering backend unit 35 and shader core unit 34 that is configured to execute a pixel shader. To determine pixels of the tile for which GPU 12 generated graphics data, rendering backend unit 35 may determine the pixels of the tile for which the pixel shader executed on shader core unit 34 to generate the graphics data for the pixels of the tile for which the GPU generated graphics data.

GPU 12 may store, in GPU cache 14, graphics data for pixels of the tile for which the GPU generated the graphics data as part of the rendering of that tile (102). For example, GPU 12 (e.g., via rendering backend unit 34) may determine respective locations in the tile for each of the pixels for which the GPU generated graphics data as part of the rendering of the tile, and determine storage locations of GPU cache 14 that correspond to the determined respective locations in the tile for each of the pixels for which GPU 12 generated graphics data as part of the rendering of the tile. In these examples, to store the graphics data, GPU 12 (e.g., via rendering backend unit 34) may be configured to store the graphics data in the determined storage locations of GPU cache 14.

GPU 12 may write, to memory 10, the graphics data stored in GPU cache 14 for pixels of the tile for which GPU 12 generated the graphics data as part of the rendering of that tile without writing graphics data stored in the local memory for all pixels of the tile (104). As one example, GPU 12 (e.g., via rendering backend unit 34) may be configured to store information that indicates where the graphics data for pixels of the tile for which GPU 12 generated the graphics data as part of the rendering of that tile are stored in GPU cache 14. In this example, to write the graphics data, GPU 12 may be configured to write the graphics data based on stored information that indicates where the graphics data for pixels of the tile for which GPU 12 generated the graphics data as part of the rendering of that tile are stored in GPU cache 14.

As another example, GPU 12 may be configured to determine one or more bounding boxes based on the determination of which pixels of the tile GPU 12 generated graphics data as part of the rendering of that tile, each bounding box encompassing a plurality and not all storage locations of GPU cache 14 that store graphics data for which GPU 12 generated graphics data as part of the rendering of that tile. In this example, to write the graphics data, GPU 12 is configured to write the graphics data of pixels of the tile that correspond to storage locations of GPU cache 14. Also, in some cases, at least one of the bounding boxes encompasses at least one storage location for a pixel for which GPU 12 did not generate graphics data as part of the rendering of the tile.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of graphics data storage, the method comprising:
   executing, with a graphics processing unit (GPU), one or more instances of a pixel shader to generate graphics data for pixels of a tile during rendering of the tile;
   subsequent to the execution of the one or more instances of the pixel shader, determining, by tracking, with a fixed-function hardware rendering backend unit of the GPU and during rendering of the tile, the pixels of the tile for which the GPU had already executed the pixel shader and for which execution of the pixel shader included requesting output of the resulting graphics data generated from the execution of the one or more instances of the pixel shader;

determining, with the GPU, locations, in the tile, of the determined pixels for which the GPU had already executed the pixel shader and for which execution of the pixel shader included requesting output of the resulting graphics data based only on a result of the tracking of pixels for which the pixel shader executed;

storing, in a local memory of the GPU, the graphics data generated from the execution of the one or more instances of the pixel shader for the determined pixels of the tile for which the GPU had already executed the pixel shader and for which execution of the pixel shader included requesting output of the resulting graphics data based on the locations of the determined pixels;

updating registers, in the GPU, with information indicating pixels for which graphics data was stored in the local memory and with information indicating the storage location in the local memory where the graphics data generated from the execution of the one or more instances of the pixel shader was stored based only on the result of the tracking of pixels for which the pixel shader executed;

determining, with the GPU, to write to an external memory that is external to an integrated circuit that includes the GPU the graphics data stored in the local memory for the determined pixels of the tile based on the registers that were updated based only on the result of the tracking of pixels for which the pixel shader executed and the updating of the registers; and writing, to the external memory that is external to the integrated circuit that includes the GPU, the graphics data stored in the local memory for the determined pixels of the tile for which the determination was made, based only on the result of the tracking of pixels for which the pixel shader executed, that the GPU had already executed the pixel shader and for which execution of the pixel shader included requesting output of the resulting graphics data without writing graphics data stored in the local memory for one or more pixels of the tile for which the pixel shader did not execute.

2. The method of claim 1, further comprising:
determining one or more bounding boxes based on the determination of the pixels of the tile for which the GPU had already executed the pixel shader and for which execution of the pixel shader included requesting output of the resulting graphics data, each bounding box encompassing a plurality and not all storage locations of the local memory that store graphics data for pixels of the tile for which the GPU generated graphics data as part of the rendering of that tile, wherein writing the graphics data comprises writing the graphics data of pixels of the tile that correspond to storage locations of the local memory encompassed by the bounding boxes.

3. The method of claim 2, wherein at least one of the bounding boxes encompasses at least one storage location for a pixel for which the GPU did not generate graphics data as part of the rendering of the tile.

4. The method of claim 1, further comprising:
determining storage locations of the local memory that correspond to the determined locations in the tile of determined pixels for which the GPU had already executed the pixel shader and for which execution of the pixel shader included requesting output of the resulting graphics data, wherein storing the graphics data comprises storing the graphics data in the determined storage locations.

5. The method of claim 1, further comprising:
retrieving, with a display processor, the graphics data stored in the external memory; and processing, with the display processor, the retrieved graphics data for display.

6. A device for graphics data storage, the device comprising:

an external memory; and an integrated circuit comprising a graphics processing unit (GPU) and a local memory, wherein the GPU is configured to:

execute, with a shader core unit of the GPU, one or more instances of a pixel shader to generate graphics data for pixels of a tile during rendering of the tile;

subsequent to the execution of the one or more instances of the pixel shader, determine, by tracking, with a fixed-function hardware rendering backend unit of the GPU and during rendering of the tile, the pixels of the tile for which the shader core unit of the GPU had already executed the pixel shader and for which execution of the pixel shader included requesting output of the resulting graphics data generated from the execution of the one or more instances of the pixel shader;

determine, with the rendering backend unit, locations, in the tile, of the determined pixels for which the shader core unit of the GPU had already executed the pixel shader and for which execution of the pixel shader included requesting output of the resulting graphics data based only on a result of the tracking of pixels for which the pixel shader executed;

store, in the local memory, the graphics data generated from the execution of the one or more instances of the pixel shader for the determined pixels of the tile for which the shader core unit of the GPU had already executed the pixel shader and for which execution of the pixel shader included requesting output of the resulting graphics data based on the location of the determined pixels;

update registers, in the GPU, with information indicating pixels for which graphics data was stored in the local memory and with information indicating the storage location in the local memory where the graphics data generated from the execution of the one or more instances of the pixel shader was stored based only on the result of the tracking of pixels for which the pixel shader executed;

determine to write to the external memory that is external to the integrated circuit that includes the GPU the graphics data stored in the local memory for the determined pixels of the tile based on the registers that were updated based only on the result of the tracking of pixels for which the pixel shader executed and the updating of the registers; and write, to the external memory that is external to the integrated circuit, the graphics data stored in the local memory for the determined pixels of the tile for which the determination was made, based only on the result of the tracking of pixels for which the pixel shader executed, that the shader core unit of the GPU had already executed the pixel shader and for which execution of the pixel shader included requesting output of the resulting graphics data without writing graphics data stored in the local memory for one or more pixels of the tile for which the pixel shader did not execute.

7. The device of claim 6, wherein the GPU is configured to:
- determine one or more bounding boxes based on the determination of which pixels of the tile the shader core unit of the GPU had already executed the pixel shader and for which execution of the pixel shader included requesting output of the resulting graphics data, each bounding box encompassing a plurality and not all storage locations of the local memory that store graphics data for which the GPU generated graphics data as part of the rendering of that tile, and
- wherein to write the graphics data, the GPU is configured to write the graphics data of pixels of the tile that correspond to storage locations of the local memory.

8. The device of claim 7, wherein at least one of the bounding boxes encompasses at least one storage location for a pixel for which the GPU did not generate graphics data as part of the rendering of the tile.

9. The device of claim 6, wherein the GPU is configured to:
- determine storage locations of the local memory that correspond to the determined locations in the tile of determined pixels for which the shader core unit of the GPU had already executed the pixel shader and for which execution of the pixel shader included requesting output of the resulting graphics data,
- wherein to store the graphics data, the GPU is configured to store the graphics data in the determined storage locations.

10. The device of claim 6, further comprising a display processor that is configured to:
- retrieve the graphics data stored in the external memory; and
- process the retrieved graphics data for display.

11. The device of claim 6, wherein the device comprises a wireless handset device.

12. A device for graphics data storage, the device comprising:
- an external memory; and
- an integrated circuit comprising a graphics processing unit (GPU) and a local memory, wherein the GPU comprises:
  - means for executing one or more instances of a pixel shader to generate graphics data for pixels of a tile during rendering of the tile;
  - means for determining, by tracking, with a fixed-function hardware rendering backend unit of the GPU and during rendering of the tile, the pixels of the tile for which the GPU had already executed the pixel shader and for which execution of the pixel shader included requesting output of the resulting graphics data generated from the execution of the one or more instances of the pixel shader subsequent to the execution of the one or more instances of the pixel shader;
  - means for determining locations, in the tile, of the determined pixels for which the GPU had already executed the pixel shader and for which execution of the pixel shader included requesting output of the resulting graphics data based only on a result of the tracking of pixels for which the pixel shader executed;
  - means for storing the graphics data generated from the execution of the one or more instances of the pixel shader for the determined pixels of the tile for which the GPU had already executed the pixel shader and for which execution of the pixel shader included requesting output of the resulting graphics data based on the locations of the determined pixels, in the local memory, as part of the rendering of that tile;
  - means for updating registers with information indicating pixels for which graphics data was stored in the local memory and with information indicating the storage location in the local memory where the graphics data generated from the execution of the one or more instances of the pixel shader was stored based only on the result of the tracking of pixels for which the pixel shader executed;
  - means for determining to write to the external memory that is external to the integrated circuit that includes the GPU the graphics data stored in the local memory for the determined pixels of the tile based on the registers that were updated based only on the result of the tracking of pixels for which the pixel shader executed and the updating of the registers; and
  - means for writing the graphics data stored in the local memory for the determined pixels of the tile for which the determination was made, based only on the result of the tracking of pixels for which the pixel shader executed, that the GPU had already executed the pixel shader and for which execution of the pixel shader included requesting output of the resulting graphics data, to the external memory, as part of the rendering of that tile without writing graphics data stored in the local memory for one or more pixels of the tile for which the pixel shader did not execute.

13. The device of claim 12, further comprising:
- means for determining one or more bounding boxes based on the determination of the pixels of the tile for which the GPU had already executed the pixel shader and for which execution of the pixel shader included requesting output of the resulting graphics data, each bounding box encompassing a plurality and not all storage locations of the local memory that store graphics data for pixels of the tile for which the GPU generated graphics data as part of the rendering of that tile,
- wherein the means for writing the graphics data comprises means for writing the graphics data of pixels of the tile that correspond to storage locations of the local memory encompassed by the bounding boxes.

14. The device of claim 13, wherein at least one of the bounding boxes encompasses at least one storage location for a pixel for which the GPU did not generate graphics data as part of the rendering of the tile.

15. The device of claim 12, further comprising:
- means for determining storage locations of the local memory that correspond to the determined locations in the tile of determined pixels for which the GPU had already executed the pixel shader and for which execution of the pixel shader included requesting output of the resulting graphics data,
- wherein the means for storing the graphics data comprises means for storing the graphics data in the determined storage locations.

16. The device of claim 12, further comprising a display processor, the display processor comprising:
- mean for retrieving the graphics data stored in the external memory; and
- means for processing the retrieved graphics data for display.

* * * * *